(12) United States Patent
Chun et al.

(10) Patent No.: US 7,601,439 B2
(45) Date of Patent: Oct. 13, 2009

(54) ORGANIC ELECTROLUMINESCENT DEVICE

(75) Inventors: Min-Seung Chun, Suwon-si (KR); Jun-Yeob Lee, Suwon-si (KR); Yong-Joong Choi, Suwon-si (KR)

(73) Assignee: Samsung Mobile Display Co., Ltd., Yongin (KR)

( * ) Notice: Subject to any disclaimer, the term of this patent is extended or adjusted under 35 U.S.C. 154(b) by 695 days.

(21) Appl. No.: 11/284,968

(22) Filed: Nov. 23, 2005

(65) Prior Publication Data
US 2006/0115679 A1    Jun. 1, 2006

(30) Foreign Application Priority Data
Nov. 27, 2004    (KR)    .................... 10-2004-0098372

(51) Int. Cl.
*H01L 51/54* (2006.01)
(52) U.S. Cl. .................... 428/690; 428/917; 313/504; 313/506
(58) Field of Classification Search .................... None
See application file for complete search history.

(56) References Cited

U.S. PATENT DOCUMENTS

| | | | |
|---|---|---|---|
| 2002/0034659 A1 | 3/2002 | Nishi et al. | |
| 2002/0125818 A1 | 9/2002 | Sato et al. | |
| 2003/0068528 A1* | 4/2003 | Thompson et al. | 428/690 |
| 2003/0072964 A1* | 4/2003 | Kwong et al. | 428/690 |
| 2003/0143422 A1 | 7/2003 | Chen | |
| 2004/0170863 A1* | 9/2004 | Kim et al. | 428/690 |
| 2004/0247937 A1* | 12/2004 | Chen et al. | 428/690 |
| 2005/0006642 A1* | 1/2005 | Tung et al. | 257/40 |
| 2005/0064233 A1* | 3/2005 | Matsuura et al. | 428/690 |
| 2006/0257684 A1* | 11/2006 | Arakane et al. | 428/690 |

FOREIGN PATENT DOCUMENTS

| | | |
|---|---|---|
| EP | 1 371 709 A1 | 12/2003 |
| JP | 2003-007467 | 1/2003 |
| JP | 2005-255986 | 9/2005 |
| JP | 2006-013482 | 1/2006 |
| KR | 1020030097363 | 12/2003 |
| WO | 03-033617 | 4/2003 |
| WO | 2004-018588 | 3/2004 |
| WO | 2004-020373 | 3/2004 |
| WO | 2004-099338 | 11/2004 |
| WO | 2004/101491 | 11/2004 |
| WO | WO 2005/029923 | * 3/2005 |

OTHER PUBLICATIONS

Gang Cheng, et al., "White Organic Light-Emitting Devices Using a Phosphorescent Sensitizer", Applied Physics Letters, vol. 82, No. 24, pp. 4224-4226, Jun. 16, 2003.

* cited by examiner

*Primary Examiner*—Dawn Garrett
(74) *Attorney, Agent, or Firm*—H.C. Park & Associates, PLC

(57) ABSTRACT

An organic electroluminescent device includes an emission layer interposed between a first electrode and a second electrode. The emission layer may be composed of a host material and a phosphorescent dopant material. The host material may be composed of a mixture of a hole transport material and an electron transport material. The hole transport material may be a carbazole compound and the electron transport material may include at least a compound selected from spirofluorenes and organic metal complexes. The use of the mixture facilitates the re-combination of holes and electrons in neighboring organic layers, thus decreasing the driving voltage and increasing the luminous efficiency and lifetime of the organic electroluminescent device.

11 Claims, 3 Drawing Sheets

ORGANIC ELECTROLUMINESCENT DEVICE

CROSS REFERENCE TO RELATED APPLICATION

This application claims priority to and the benefit of Korean Patent Application No. 10-2004-0098372, filed on Nov. 27, 2004, which is hereby incorporated by reference for all purposes as if fully set forth herein.

BACKGROUND OF THE INVENTION

1. Field of the Invention

This invention relates to an organic electroluminescent device (OLED) that includes an emission layer composed of a phosphorescent dopant. The organic electroluminescent device has a low driving voltage, an excellent current density, a long lifetime, and high luminous efficiency.

2. Discussion of the Background

Phosphorescent materials are organic metal compounds having heavy atoms. Phosphorescent materials emit light when the relaxation of triplet excitons occurs because the relaxation of triplet excitons is a forbidden transition. Fluorescent materials use singlet excitons having a generation probability of 25%. Phosphorescent materials use triplet excitons having a generation probability of 75%, and therefore have better luminous efficiency than fluorescent materials.

An emission layer composed of a phosphorescent material may include a host and a dopant. The dopant receives energy from the host, thus emitting light. Dopants have been continually developed. Princeton University and South California University have presented materials using an Ir metal compound, for example.

Recently, an emission layer composed of a carbazole compound as a host has been developed. The carbazole compound has a larger triplet-state energy band gap than 4,4'-biscarbazolylbiphenyl (CBP). However, the efficiency and lifetime of phosphorescent devices that use previously known carbazole compounds are far below the desirable level.

SUMMARY OF THE INVENTION

This invention provides an organic electroluminescence device with excellent luminous efficiency and a long lifetime.

Additional features of the invention will be set forth in the description which follows, and in part will be apparent from the description, or may be learned by practice of the invention.

The present invention discloses an organic electroluminescent device which may include a first electrode, a second electrode, and an emission layer interposed between the first electrode and the second electrode. The emission layer may include a host and a phosphorescent dopant. The host may be a mixed host including a hole transport material and an electron transport material.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
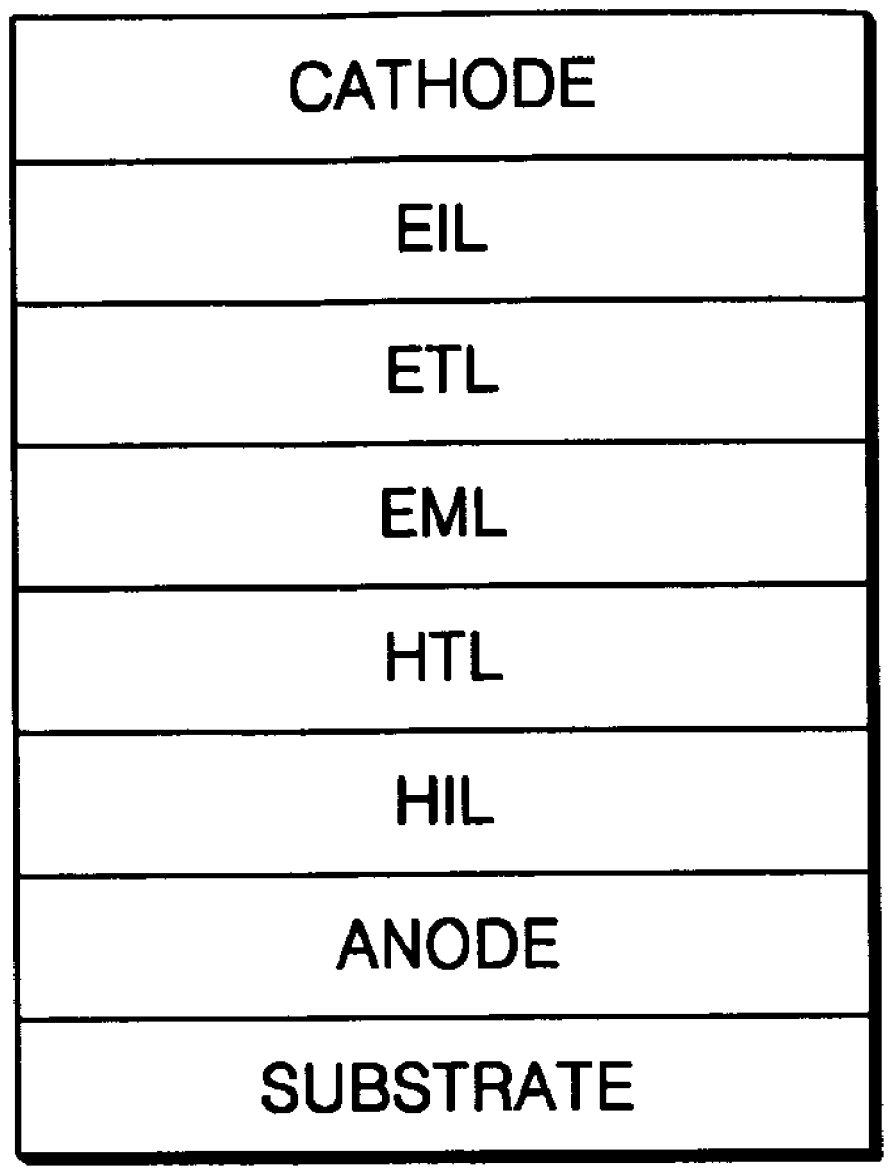
FIG. 1 shows a sectional view of an organic electroluminescent device according to an embodiment of the present invention.

According to an exemplary embodiment of the present invention, the host component of an emission layer of an organic electroluminescent device is composed of a mixture of a carbazole compound and at least a compound selected from spirofluorenes and organic metal complexes. The carbazole compound is a hole transport material, and the other compound is an electron transport material. The use of the mixture of the carbazole and the compound facilitates the re-combination of holes and electrons in neighboring organic layers, thus reducing the driving voltage and increasing the luminous efficiency and lifetime of the organic electroluminescent device.

The highest occupied molecular orbital (HOMO) and lowest unoccupied molecular orbital (LUMO) of the hole transport material affect the HOMO and LUMO of the electron transport material and vice versa. This allows a wider energy band to be formed than can be formed in the case of a single host. Therefore, holes and electrons can be easily transferred to the emission dopant. The wide energy band of the HOMO and LUMO allow easy movement of carriers from an adjacent hole transport layer and an adjacent electron transport layer. Therefore, disruption of carrier injection by an energy barrier, which occurs when two organic layers contact, can be minimized. The use of the mixture of the hole transport material and the electron transport material prevents the respective host materials from crystallizing. Defects occurring in this process form a trap state between energy levels of the host and the dopant so that carriers can easily move. A carrier density due to an energy barrier at interfaces between the hole transport layer and the emission layer and between the electron transport layer and the emission layer is substantially lower than in a case where a single host with evenly dispersed emission excimers is used. Therefore, luminous efficiency increases and a hole blocking layer may not be required for the device in some instances.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity.

It will be understood that when an element such as a layer, film, region or substrate is referred to as being "on" another element, it can be directly on the other element or intervening elements may also be present. In contrast, when an element is referred to as being "directly on" another element, there are no intervening elements present.

The hole transport material may be a compound containing a carbazole ring. The compound containing a carbazole ring may include at least 1,3,5-tricarbazolyl benzene, 4,4'-biscarbazolylbiphenyl (CBP), polyvinylcarbazole, m-biscarbazolylphenyl, 4,4'-biscarbazolyl-2,2'-dimethylbiphenyl, 4,4', 4"-tri(N-carbazolyl)triphenylamine, 1,3,5-tri(2-carbazolylphenyl)benzene, 1,3,5-tris(2-carbazolyl-5-methoxyphenyl)benzene, or bis(4-carbazolylphenyl)silane.

The electron transport material may include at least a spirofluorene compound containing a spirofluorene ring, or an organic metal complex.

The spirofluorene compound may have various structures. For example, two spirofluorenes can be connected to each other by a bridge, and the bridge can be substituted with triazole, oxadiazole, naphthalene, anthracene, phenyl, or the like. Alternatively, the $9^{th}$ position of each spirofluorene compound can be substituted with O, S, Se, N—R, P—R, or the like, or one spirofluorene can be connected to the other spirofluorene by N—R or P—R. In this case, R may be H, a $C_{1-20}$ alkyl group, a $C_{5-20}$ aryl group containing a $C_{1-20}$ alkyl group, a $C_{2-20}$ heteroaryl group, is or a $C_{6-20}$ aryl group containing a $C_{1-20}$ alkoxy group. The spirofluorene compound may be 2,5-dispirobifluorene-1,3,4-oxadiazole.

The organic metal complex may include at least bis(8-hydroxyquinolato)biphenoxy metal, bis(8-hydroxyquinolato)phenoxy metal, bis(2-methyl-8-hydroxyquinolato)biphenoxy metal, bis(2-methyl-8-hydroxyquinolato)phenoxy metal, bis(2-methyl-8-quinolinolato)(para-phenyl-phenolato) metal, or bis(2-(2-hydroxyphenyl)quinolato) metal. The metal may be Al, Zn, Be, or Ga.

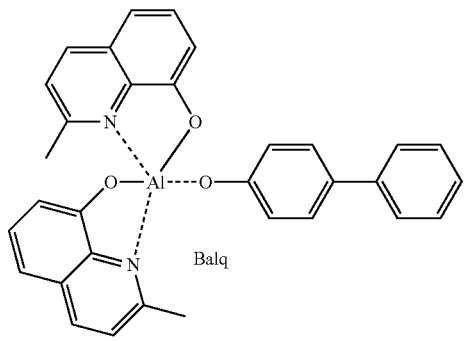

Balq

The amount of the host in the emission layer may be in the range of about 70 to about 99 parts by weight based on 100 parts by weight of the total amount of the host and the dopant. The amount of the dopant in the emission layer may be in the range of about 1 to about 30 parts by weight based on 100 parts by weight of the total amount of the host and the dopant. Triplet extinction occurs when less than 80 parts by weight of the host is included. This is undesirable because it decreases efficiency. The efficiency and lifetime of the organic electroluminescent device are decreased due to a lack of emission material when more than 99 parts by weight of the host is included, which is also undesirable.

The mixing ratio of the hole transport material to the electron transport material in the host material may be in the range of about 1:19 to about 19:1, preferably, in the range of about 1:10 to about 10:1, more preferably, in the range of about 2:1 to about 4:1, and most preferably, about 3:1. When the amount of the hole transport material or the electron transport material is less than about 5 parts by weight or greater than about 95 parts by weight based on 100 parts by weight of the host, the organic electroluminescent device provides the same luminous efficiency characteristics as an organic electroluminescent device that includes a host composed of only a single material.

The phosphorescent dopant used to form an emission layer according to the present invention is an emission material. Such an emission material may be, but is not limited to, at least bisthienylpyridine acetylacetonate Iridium, bis(benzothienylpyridine)acetylacetonate Iridium, bis(2-phenylbenzothiazole)acetylacetonate Iridium, bis(1-phenylisoquinoline)Iridium acetylacetonate, tris(1-phenylisoquinoline) iridium, tris(phenylpyridine) iridium, tris(2-biphenylpyridine)iridium, tris(3-biphenyl pyridine)iridium, tris(4-biphenyl pyridine) iridium, or Ir(pq)2(acac) where pq denotes 2-phenylquinoline and acac denotes acetylacetone.

In an exemplary embodiment, the host of the emission layer may be a mixture of CBP and a spirofluorene compound in a ratio range of about 4:1 to about 2:1, and preferably, about 3:1. The phosphorescent dopant may be $(Ir(ppy)_3)$ or $(Ir(pq) 2(acac))$. The emission layer may be doped with about 8 to about 12 parts by weight of the phosphorescent dopant based on 100 parts by weight of the host. The use of the mixture of CBP and the spirofluorene compound as a host results in an increase in luminous efficiency and a decrease in a driving voltage.

In an exemplary embodiment, the host of the emission layer may be CBP and BAlq. In this case, the lifetime of the organic electroluminescent device increases substantially. The mixing ratio of CBP and BAlq is in a ratio range of about 4:1 to about 2:1, and preferably, about 3:1. The phosphorescent dopant may be $(Ir(ppy)_3)$ or $Ir(pq)_2(acac)$.

A method of manufacturing an organic electroluminescent device according to an exemplary embodiment of the present invention will now be described with reference to FIG. 1.

An upper surface of a substrate may be coated with an anode material to form an anode. The anode may be used as a first electrode. The substrate may be a substrate used in a conventional organic electroluminescent device, such as glass or plastic. The substrate should be transparent, waterproof, have a smooth surface, and be easily treated. The anode material may be a high work function ($\geqq 4.5$ eV), transparent and highly conducting metal, such as Indium Tin Oxide (ITO), Indium Zinc Oxide (IZO), $SnO_2$, ZnO, or the like.

Organic layers may be formed on the anode by vacuum evaporation. Alternatively, spin-coating, dip-coating, doctor-blading, inkjet printing, or thermal transferring may be used to form organic layers after dissolving the organic layer materials in a solvent. The organic layers are preferably formed by thermal evaporation.

A hole injection layer (HIL) may be formed on the anode by vacuum evaporation, spin-coating, dip-coating, doctor-blading, inkjet printing, or thermal transferring. The HIL may be about 50 Å to about 1500 Å thick. Hole injecting characteristics deteriorate when the HIL is less than about 50 Å thick, which is undesirable. The driving voltage of the organic electroluminescent device increases when the HIL is more than about 1500 Å thick, which is also undesirable.

The hole injection layer may be composed of, but is not limited to, copper phthalocyanine (CuPc), a starburst-type amine such as TCTA, m-MTDATA, HI406 (available from Idemitz Co.), or the like.

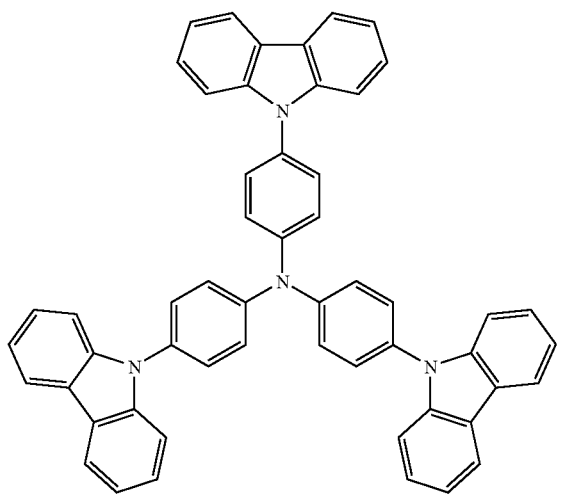

TCTA m-MTDATA

A hole transport layer (HTL) may be formed on the HIL by vacuum evaporation, inkjet printing, laser transfer, or photolithography. The material forming the HTL may be, but is not limited to, N,N'-bis(3-methylphenyl)-N,N'-diphenyl-[1,1-biphenyl]-4,4'-diamine(TPD); N,N'-di(naphtalene-1-yl)-N,N'-diphenyl benxidine; N,N'-di(naphtalene-1-yl)-N,N'-diphenyl-benxidine (NPD); IDE320 (obtained from Idemitz Co.); N,N'-diphenyl-N,N'-bis(1-naphtyl)-(1,1'-biphenyl)-4,4'-diamine (NPB), or the like. The HTL may be about 50 Å to about 1500 Å thick. Hole transporting characteristics deteriorate when the HTL is less than about 50 Å thick, which is undesirable. The driving voltage of the organic electroluminescent device increases when the HTL is more than about 1500 Å thick, which is also undesirable.

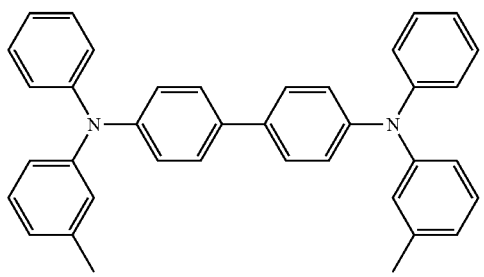

TPD

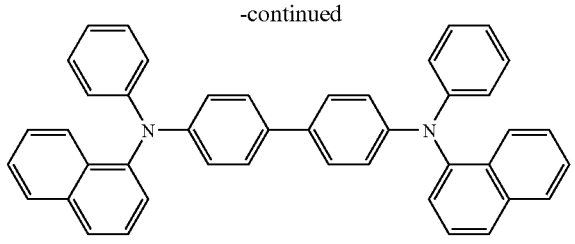

α-NPD

An emission layer (EML) composed of a mixture of a host material and a phosphorescent dopant may be formed on the HTL. In an exemplary embodiment of the invention, a mixture of an electron transport material and a hole transport material is used as the host. The EML may be formed by vacuum evaporation, inkjet printing, laser transfer, or photolithography, but is not limited thereto.

The EML may be about 100 Å to about 800 Å thick, and particularly, about 300 Å to about 400 Å thick. The efficiency and lifetime of the organic electroluminescent device decrease when the EML is less than about 100 Å thick, which is undesirable. A driving voltage increases when the EML is more than about 800 Å thick, which is also undesirable.

When the phosphorescent dopant is used to form the emission layer, a hole blocking layer (HBL)(not shown) may be formed by vacuum-depositing or spincoating a hole blocking material on the EML.

An electron transport layer (ETL) may be formed by vacuum-depositing or spin-coating an electron transporting material on the EML. The electron transporting material may be, but is not limited to, Alq3. The electron transport layer may be about 50 Å to about 600 Å thick. The lifetime of the organic electroluminescent device decreases when the ETL is less than about 50 Å thick, which is undesirable. The driving voltage increases when the ETL is more than about 600 Å thick, which is also undesirable.

An electron injection layer (EIL) may be formed on the ETL. The EIL may be composed of LiF, NaCl, CsF, $Li_2O$, BaO, Liq, or the like. The EIL may be about 1 Å to about 100 Å thick. The electron injecting ability decreases when the EIL is less than about 1 Å thick, thus increasing the driving voltage of the organic electroluminescent device, which is undesirable. The EIL acts as an insulator when the EIL is more than about 100 Å thick, thus increasing the driving voltage of the organic electroluminescent device, which is also undesirable.

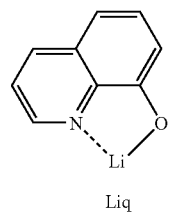

Liq

A cathode metal may be vacuum deposited or sputtered on the EIL to form a cathode, which functions as a second electrode. The cathode metal may be Li, Mg, Al, Al—Li, Ca, Mg—In, Mg—Ag, or the like. Following this step, the organic electroluminescent device may be considered to be completed.

The organic electroluminescent device according to the present invention may include an anode, a HIL, a HTL, an EML, an ETL, an EIL, a cathode, and may further include one or two intermediate layers and an electron blocking layer.

An exemplary embodiment of the present invention will now be described in further detail with reference to the following examples. The following examples are for illustrative purposes and are not intended to limit the scope of the present invention.

Example 1

First, a glass substrate of CORNING 15 $\Omega/cm^2$ (1200 Å) ITO, used as an anode, was cut to a size of 50 mm×50 mm×0.7 mm. The resultant glass substrate was cleaned using ultrasonic waves in isopropyl alcohol for 5 minutes, then cleaned using ultrasonic waves in pure water for 5 minutes, and then cleaned using UV and ozone for 30 minutes. The glass substrate was coated with a metal to form an anode on the glass substrate.

N,N'-di(1-naphtyl)-N,N'-diphenylbenxidine(NPD) was vacuum-deposited on the substrate to form a hole transport layer about 600 Å thick.

69 parts by weight of CBP, 23 parts by weight of 2,5-dispirobifluorene-1,3,4-oxadiazole and 8 parts by weight of Ir(ppy)$_3$ were co-deposited on the hole transport layer to form an emission layer about 400 Å thick. In this case, the CBP and 2,5-dispirobifluorene-1,3,4-oxadiazole were used as a host. CBP was used as the hole transport material. 2,5-dispirobifluorene-1,3,4-oxadiazole was used as the electron transport material. Ir(ppy)$_3$ was used as the phosphorescent dopant.

Alq3 was deposited on the emission layer to form an electron transport layer about 300 Å thick.

LiF was vacuum-deposited on the electron transport layer to form an electron injection layer about 10 Å thick. Al was deposited on the electron injection layer to form a cathode about 1000 Å thick, thereby forming a LiF/Al electrode. Following this step, the organic electroluminescent device was considered to be completed.

Example 2

An organic electroluminescent device was manufactured in the same manner as in Example 1, except that 80 parts by weight of CBP and 8 parts by weight of 2,5-dispirobifluorene-1,3,4-oxadiazole were used.

Example 3

An organic electroluminescent device was manufactured in the same manner as is in Example 1, except that 46 parts by weight of CBP and 46 parts by weight of 2,5-dispirobifluorene-1,3,4-oxadiazole were used.

Example 4

An organic electroluminescent device was manufactured in the same manner as in Example 1, except that 23 parts by weight of CBP and 69 parts by weight of 2,5-dispirobifluorene-1,3,4-oxadiazole were used.

Example 5

An organic electroluminescent device was manufactured in the same manner as in Example 1, except that 8 parts by weight of CBP and 80 parts by weight of 2,5-dispirobifluorene-1,3,4-oxadiazole were used.

Comparative Example 1

First, a glass substrate of CORNING 15 $\Omega/cm^2$ (1200 Å) ITO, used as an anode, was cut to a size of 50 mm×50 mm×0.7 mm. The resultant glass substrate was cleaned using ultrasonic waves in isopropyl alcohol for 5 minutes, then cleaned using ultrasonic waves in pure water for 5 minutes, and then cleaned using UV and ozone for 30 minutes. The glass substrate was coated with a metal to form an anode on the glass substrate.

NPD was vacuum-deposited on the substrate to form a hole transport layer about 600 Å thick. Then, 92 parts by weight of 4,4'-biscarbazolylbiphenyl and 8 parts by weight of Ir(ppy)$_3$ were co-deposited on the hole transport layer to form an emission layer about 400 Å thick. 4,4'-biscarbazolylbiphenyl that was used as the host. Ir(ppy)$_3$ was used as the phosphorescent dopant Alq3 was deposited on the emission layer to form an electron transport layer about 300 Å thick.

LiF was vacuum-deposited on the electron transport layer to form an electron injection layer about 10 Å thick. Al was deposited on the electron injection layer to form a cathode about 1000 Å thick, thereby forming a LiF/Al electrode. Following this step, the organic electroluminescent device was considered to be completed.

Comparative Example 2

An organic electroluminescent device was manufactured in the same manner as in Comparative Example 1, except that the host of the emission layer was 2,5-dispirobifluorene-1,3,4-oxadiazole, which is an electron transport material.

The Efficiency and lifetime of the organic electroluminescent devices of Example 1, Example 2, Example 3, Example 4 and Example 5 and Comparative Example 1 and Comparative Example 2 were measured. The results are shown in FIG. 2 and FIG. 3.

Figure 2:
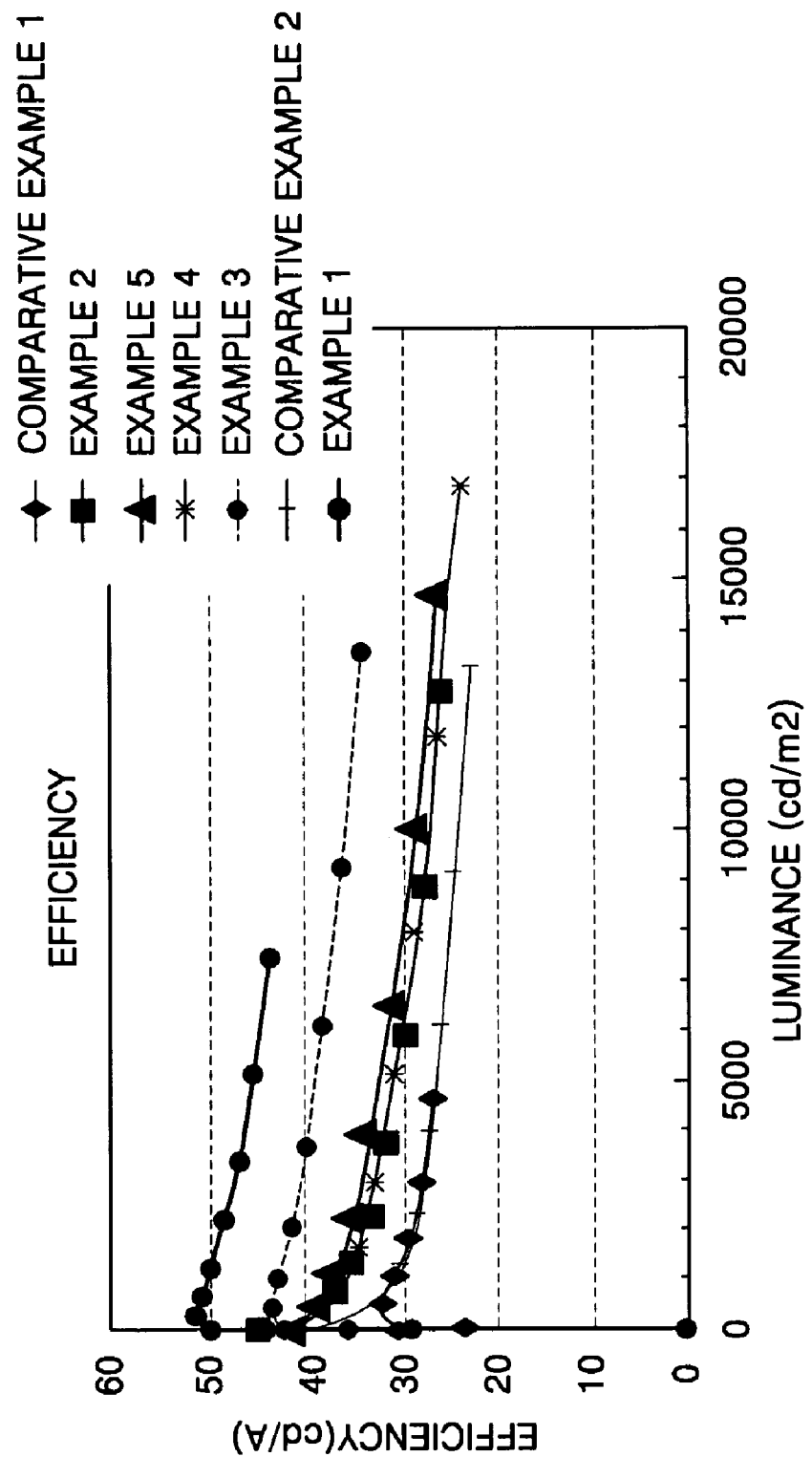
FIG. 2 shows a graph of efficiency with respect to luminance of organic electroluminescent devices according to Example 1, Example 2, Example 3, Example 4 and Example 5 and Comparative Example 1 and Comparative Example 2.
Figure 3:
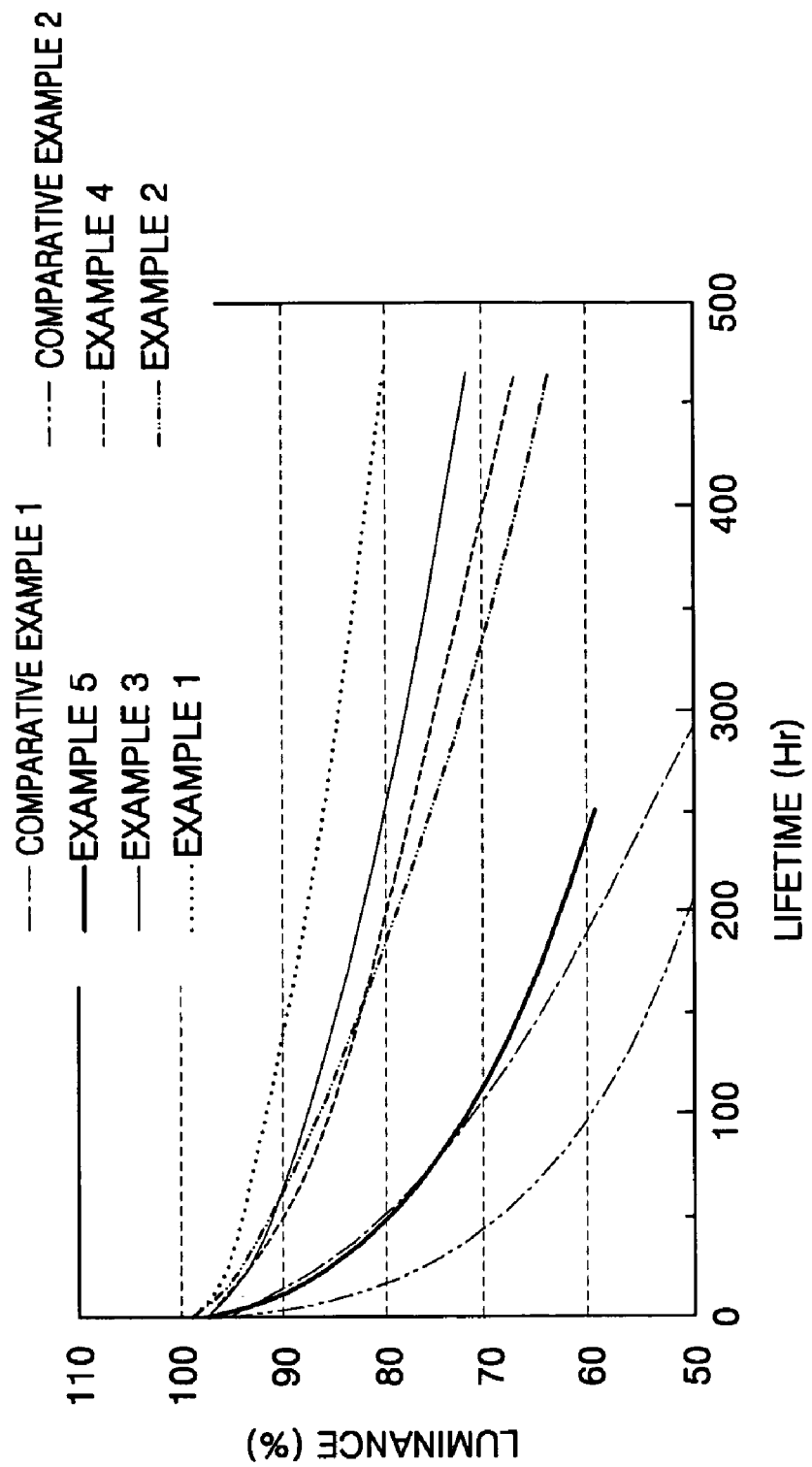
FIG. 3 shows a graph of luminance with respect to the lifetimes of organic electroluminescent devices according to Example 1, Example 2, Example 3, Example 4 and Example 5 and Comparative Example 1 and Comparative Example 2.

Referring to FIG. 2 and FIG. 3, the organic electroluminescent devices of Example 1, Example 2, Example 3, Example 4 and Example 5 have higher luminous efficiency and a longer lifetime than the organic electroluminescence devices of Comparative Example 1 and Comparative Example 2.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An organic electroluminescent device, comprising:
   a first electrode, a second electrode, and an emission layer interposed between the first electrode and the second electrode,
   wherein the emission layer comprises a host and a phosphorescent dopant,
   wherein the host is a mixed material comprising a hole transport material and an electron transport material,
   wherein the electron transport material comprises a spirofluorene compound comprising 2,5-dispirobifluorene-1,3,4-oxadiazole.

2. The organic electroluminescent device of claim 1, wherein the hole transport material is a carbazole compound.

3. The organic electroluminescent device of claim 2, wherein the carbazole compound comprises at least a compound selected from the group consisting of 1,3,5-tricarbazolyl benzene, 4,4'-biscarbazolylbiphenyl (CBP), polyvinylcarbazole, m-biscarbazolylphenyl, 4,4'-biscarbazolyl-2,2'-dimethylbiphenyl, 4,4',4"-tri(N-carbazolyl)triphenylamine, 1,3,5-tri(2-carbazolylphenyl) benzene, 1,3,5-tris(2-carbazolyl-5-methoxyphenyl) benzene, and bis(4-carbazolylphenyl)silane.

4. The organic electroluminescent device of claim 1, wherein the weight ratio of the hole transport material to the electron transport material is in the range of about 1:19 to about 19:1.

5. The organic electroluminescent device of claim 1, wherein the emission layer comprises about 70 to about 99 parts by weight of the host and about 1 to about 30 parts by weight of the phosphorescent dopant.

6. The organic electroluminescent device of claim 1, wherein the phosphorescent dopant comprises at least a compound selected from the group consisting of bisthienylpyridine acetylacetonate Iridium, bis(benzothienylpyridine)acetylacetonate Iridium, bis(2-phenylbenzothiazole)acetylacetonate Iridium, bis(1-phenylisoquinoline)Iridium acetylacetonate, tris(1-phenylisoquinoline)iridium, tris(phenylpyridine) iridium, tris(2-biphenylpyridine)iridium, tris(3-biphenyl pyridine)iridium, tris(4-biphenyl pyridine) iridium, and $Ir(pq)_2(acac)$.

7. The organic electroluminescent device of claim 1, further comprising at least one layer interposed between the first electrode and the emission layer, wherein the layer is selected from the group consisting of a hole injection layer and a hole transport layer.

8. The organic electroluminescent device of claim 1, further comprising at least one layer interposed between the emission layer and the second electrode, wherein the layer is selected from the group consisting of a hole blocking layer, an electron transport layer, and an electron injection layer.

9. The organic electroluminescent device of claim 1, wherein the phosphorescent dopant is tris(2-phenylpyridine)Iridium($Ir(ppy)_3$), and wherein an amount of the phosphorescent dopant is in the range of about 5 to about 15 parts by weight based on 100 parts by weight of the total amount of the host and the phosphorescent dopant.

10. The organic electroluminescent device of claim 1, wherein the hole transport material comprises 4,4'-biscarbazolylbiphenyl and a weight ratio of the 4,4'-biscarbazolylbiphenyl to the spirofluorene compound is in the range of about 4:1 to about 2:1.

11. The organic electroluminescent device of claim 1, wherein the phosphorescent dopant is $Ir(pq)_2(acac)$, and wherein an amount of the phosphorescent dopant is in the range of about 5 to about 15 parts by weight based on 100 parts by weight of the total amount of the host and the phosphorescent dopant.

* * * * *

UNITED STATES PATENT AND TRADEMARK OFFICE
CERTIFICATE OF CORRECTION

PATENT NO. : 7,601,439 B2
APPLICATION NO. : 11/284968
DATED : October 13, 2009
INVENTOR(S) : Chun et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 994 days.

Signed and Sealed this

Fifth Day of October, 2010

David J. Kappos
*Director of the United States Patent and Trademark Office*